United States Patent
Yuan et al.

(10) Patent No.: US 12,536,033 B2
(45) Date of Patent: Jan. 27, 2026

(54) APPLICATION KEEPALIVE METHOD AND APPARATUS, AND ELECTRONIC DEVICE

(71) Applicant: Huawei Technologies Co., Ltd., Shenzhen (CN)

(72) Inventors: Xiaofeng Yuan, Shenzhen (CN); Zefei Dou, Shenzhen (CN); Pengxiang Yi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 743 days.

(21) Appl. No.: 17/918,360

(22) PCT Filed: Mar. 4, 2021

(86) PCT No.: PCT/CN2021/079030
§ 371 (c)(1),
(2) Date: Oct. 12, 2022

(87) PCT Pub. No.: WO2021/208626
PCT Pub. Date: Oct. 21, 2021

(65) Prior Publication Data
US 2023/0147061 A1    May 11, 2023

(30) Foreign Application Priority Data
Apr. 13, 2020   (CN) .......................... 202010284992.0

(51) Int. Cl.
*G06F 9/48*    (2006.01)
*G06F 9/445*   (2018.01)
*G06F 9/50*    (2006.01)

(52) U.S. Cl.
CPC .......... *G06F 9/485* (2013.01); *G06F 9/44594* (2013.01); *G06F 9/5038* (2013.01)

(58) Field of Classification Search
CPC .................................. G06F 9/485; G06F 9/451
See application file for complete search history.

(56) References Cited

U.S. PATENT DOCUMENTS 9,250,958 B2    2/2016   Mark et al.
2012/0324481 A1   12/2012  Xia et al.
(Continued)

FOREIGN PATENT DOCUMENTS

| CN | 105843650 A | 8/2016 |
| CN | 107463403 A | 12/2017 |
| CN | 110489215 A | 11/2019 |

OTHER PUBLICATIONS

Li Cong et al:"Optimizing low memory killers for mobile devices using reinforcement learning", 2017 13th International Wireless Communications and Mobile Computing Conference(IWCMC), IEEE, Jun. 26, 2017, XP033125611, 6 pages.

*Primary Examiner* — Lewis A Bullock, Jr.
*Assistant Examiner* — Jordan Scott Motter
(74) *Attorney, Agent, or Firm* — Conley Rose, P.C.

(57) ABSTRACT

An application keepalive method includes, when a foreground application run by the electronic device is switched from a first application to a second application, a callback probability of the second application relative to the first application is obtained, and when the callback probability of the second application relative to the first application is greater than a preset threshold, a keepalive priority of the first application is increased when the first application is used as a background application. When system resources are insufficient, the electronic device ends a process of at least one background application in ascending order of keepalive priorities to release system resources.

16 Claims, 14 Drawing Sheets

(56) References Cited

U.S. PATENT DOCUMENTS

| | | |
|---|---|---|
| 2015/0347181 A1 | 12/2015 | Myrick et al. |
| 2018/0307600 A1* | 10/2018 | Wang ................... G06F 12/02 |
| 2020/0226433 A1* | 7/2020 | Zeng ................... G06F 11/302 |
| 2020/0241917 A1* | 7/2020 | Chen ................... G06F 9/4843 |
| 2021/0149689 A1* | 5/2021 | Jung ................... G06F 9/445 |

* cited by examiner

APPLICATION KEEPALIVE METHOD AND APPARATUS, AND ELECTRONIC DEVICE

CROSS-REFERENCE TO RELATED APPLICATIONS

This is a U.S. National Stage of International Patent Application No. PCT/CN2021/079030 filed on Mar. 4, 2021, which claims priority to Chinese Patent Application No. 202010284992.0 filed on Apr. 13, 2020. Both of the aforementioned applications are hereby incorporated by reference in their entireties.

TECHNICAL FIELD

This application relates to the field of computer technologies, and in particular, to an application keepalive method and apparatus, and an electronic device.

BACKGROUND

When using an electronic device such as an artificial intelligence (artificial intelligence, AI) terminal, a smartphone, a tablet computer, a smartwatch, and a smart band, a user often switches between two applications. For example, a common switching scenario is as follows: The user first switches a foreground application from a first application to a second application, and then switches the foreground application from the second application back to the first application after the second application completes a specific operation.

When an application runs in the background, the electronic device sets a relatively low keepalive priority for the application. When system resources are insufficient, to avoid interface freezing and slow response of the foreground application, the electronic device clears a background application in ascending order of keepalive priorities, for example, ends a process of the background application, to release system resources.

However, in the foregoing scenario, if the first application is scanned and killed when running in the background, when the user switches the foreground application from the second application back to the first application, the first application needs to be restarted to load interface resources, and a previous running status is lost. This reduces user experience.

SUMMARY

This application provides an application keepalive method and apparatus, and an electronic device, to optimize a background application scanning and killing mechanism of an electronic device system, and improve use experience when a user performs an application switching operation.

According to a first aspect, this application provides an application keepalive method. The method includes: when a foreground application is switched from a first application to a second application, obtaining a callback probability of the second application relative to the first application, where the callback probability of the second application relative to the first application is a probability that the foreground application is switched from the second application back to the first application within first preset duration after the foreground application is switched from the first application to the second application; and when the callback probability of the second application relative to the first application is greater than a preset threshold, increasing a keepalive priority of the first application when the first application is used as a background application. When system resources are insufficient, an electronic device ends a process of at least one background application in ascending order of keepalive priorities, to release system resources.

According to the foregoing technical solution, when the callback probability of the second application relative to the first application is relatively high, a background process of the first application is not likely to be scanned and killed by the electronic device, so that when the foreground application is switched from the second application back to the first application, the first application can continue to run in the foreground in a state before being switched to the background for running. In this way, operations of a user on the first application can be seamlessly connected. This meets a user's intent to continue using the first application, and improves user experience.

In an implementation, before obtaining the callback probability from the second application to the first application when the foreground application is switched from the first application to the second application, the method further includes: generating a foreground running record for each application that has run in the foreground. Each foreground running record includes an application name of one application and duration for which the application is used as a foreground application once. When a plurality of foreground running records are generated, the plurality of foreground running records are arranged in a time sequence in which applications corresponding to the plurality of foreground running records run in the foreground. Therefore, the electronic device may calculate the callback probability from the second application to the first application based on the foreground running record.

In an implementation, before obtaining the callback probability from the second application to the first application when the foreground application is switched from the first application to the second application, the method further includes: obtaining, based on the plurality of foreground running records, switching times of switching the foreground application from the first application to the second application. For a foreground running record N and a foreground running record N+1 that are generated adjacently, where N is a natural number, when the foreground running record N corresponds to the first application and the foreground running record N+1 corresponds to the second application, the switching times of switching the foreground application from the first application to the second application is increased by 1.

In an implementation, before obtaining the callback probability from the second application to the first application when the foreground application is switched from the first application to the second application, the method further includes: obtaining callback times of the second application relative to the first application based on the plurality of foreground running records. For the foreground running record N, the foreground running record N+1, and a foreground running record N+2 that are generated adjacently, where N is a natural number, when the foreground running record N and the foreground running record N+2 correspond to the first application, and the foreground running record N+1 corresponds to the second application, whether duration recorded in the foreground running record N+1 is less than or equal to the first preset duration is determined. When the duration recorded in the foreground running record N+1 is less than or equal to the first preset duration, the callback times of the second application relative to the first application is increased by 1.

In an implementation, before obtaining the callback probability from the second application to the first application when the foreground application is switched from the first application to the second application, the method further includes: calculating the callback probability of the second application relative to the first application. The callback probability of the second application relative to the first application is equal to a ratio of the callback times of the second application relative to the first application to the switching times of switching the foreground application from the first application to the second application.

In an implementation, the increasing a keepalive priority of the first application when the first application is used as a background application includes: increasing the keepalive priority of the first application from a default priority to a first priority, so that the first application is not killed when running in the background.

In an implementation, after the increasing the keepalive priority of the first application from a default priority to a first priority, the method further includes: when duration for which the second application is currently used as the foreground application is greater than the first preset duration, decreasing the keepalive priority of the first application from the first priority to the default priority. It should be understood that, when the duration for which the second application is currently used as the foreground application is greater than the first preset duration, there is no callback association between the first application and the second application in the current switching operation, which means that the user may need to use the second application as the foreground application for long time. In this case, the electronic device does not perform special protection on the first application.

In an implementation, after the increasing the keepalive priority of the first application from a default priority to a first priority, the method further includes: when the foreground application is switched from the second application to a transition application, determining whether duration for which the transition application runs in the foreground is greater than second preset duration; and when the duration for which the transition application runs in the foreground is greater than the second preset duration, decreasing the keepalive priority of the first application from the first priority to the default priority. The transition application includes at least a home screen application, a multitask window application, and a notification bar application. It should be understood that, if the duration for which the transition application runs in the foreground is greater than the second preset duration, it means that the user does not want to switch back to the first application. In this case, the electronic device does not perform special protection on the first application.

In an implementation, after the increasing the keepalive priority of the first application from a default priority to a first priority, the method further includes: when the foreground application is switched from the second application to a third application, decreasing the keepalive priority of the first application from the first priority to the default priority, where the third application is not a transition application. It should be understood that, when the foreground application is switched from the second application to the third application, it indicates that there is no callback association between the first application and the second application in the current switching operation. In this case, the electronic device does not perform special protection on the first application.

In an implementation, when the foreground application is switched from the first application to the second application, if the callback probability is not obtained, determining whether the second application directly jumps from the first application to the foreground for running; and when the second application directly jumps from the first application to the foreground for running, increasing the keepalive priority of the first application from a default priority to a first priority. It should be understood that if the second application directly jumps from the first application to the foreground for running, it indicates that there is a relatively high probability that the first application and the second application have a callback association. In this case, the electronic device increases the keepalive priority of the first application, so that the first application is not killed when running in the background.

In an implementation, that the system resources of the electronic device are insufficient includes: available memory RAM of the electronic device is lower than a preset memory threshold, and/or processor usage of the electronic device is higher than a preset usage threshold, and/or power consumption of the electronic device is higher than a preset power consumption threshold.

According to a second aspect, this application further provides an application keepalive apparatus. The application keepalive apparatus has a function of implementing behavior of the foregoing electronic device. The function may be implemented by hardware, or may be implemented by hardware executing corresponding software. The hardware or software includes one or more units or modules corresponding to the foregoing function. In a possible design, the application keepalive apparatus includes: a callback probability obtaining unit, configured to: when a foreground application is switched from a first application to a second application, obtain a callback probability of the second application relative to the first application, Where the callback probability of the second application relative to the first application is a probability that the foreground application is switched from the second application back to the first application within first preset duration after the foreground application is switched from the first application to the second application; and a keepalive priority adjustment unit, configured to: when the callback probability of the second application relative to the first application is greater than a preset threshold, increase a keepalive priority of the first application when the first application is used as a background application. When system resources are insufficient, an electronic device ends a process of at least one background application in ascending order of keepalive priorities, to release system resources.

According to a third aspect, this application provides an electronic device. The electronic device includes a display, a memory, and one or more processors, the display and the memory are coupled to the processor, the memory is configured to store computer program code, the computer program code includes computer instructions, and when the processor executes the computer instructions, the electronic device is enabled to perform the method according to any one of the first aspect and the implementations of the first aspect.

According to a fourth aspect, this application provides a chip system. The chip system includes a processor and a memory. The memory is coupled to the processor. The memory stores computer instructions. When the processor executes the computer instructions, an electronic device is enabled to perform the method according to any one of the first aspect and the implementations of the first aspect.

According to a fifth aspect, this application provides a computer storage medium. The computer storage medium includes computer instructions. When the computer instructions are run on an electronic device, the electronic device is enabled to perform the method according to any one of the first aspect and the implementations of the first aspect.

According to a sixth aspect, this application provides a computer program product. When the computer program product runs on a computer, the computer is enabled to perform the method according to any one of the first aspect and the implementations of the first aspect.

It may be understood that for beneficial effects that can be achieved by the apparatus in the second aspect, the electronic device in the third aspect, the chip system in the fourth aspect, the computer storage medium in the fifth aspect, and the computer program product in the sixth aspect that are provided above, refer to beneficial effects in the first aspect and any implementation of the first aspect. Details are not described herein again.

DESCRIPTION OF EMBODIMENTS

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

Figure 1:
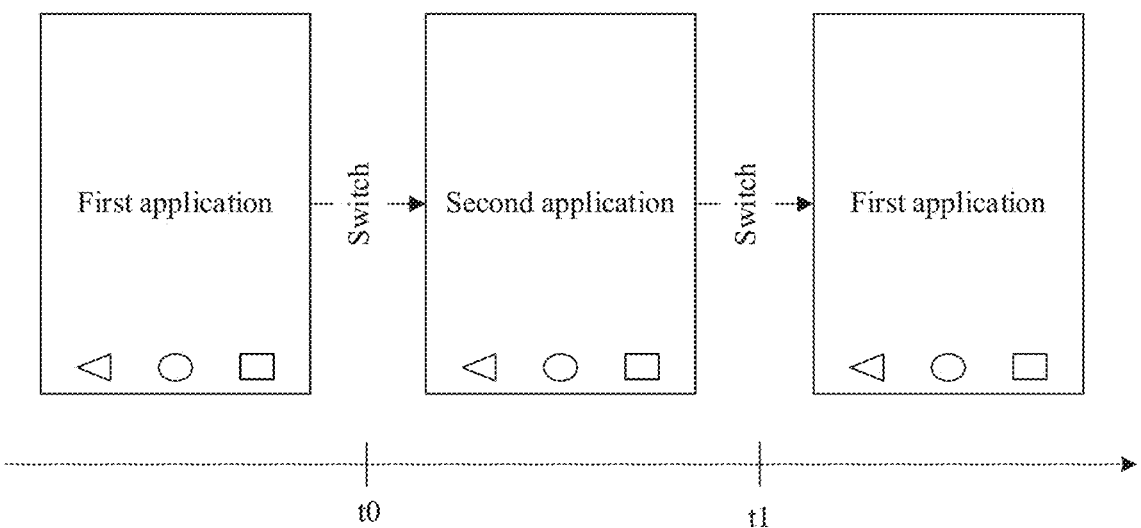
FIG. 1 shows an application switching behavior of a user when the user uses an electronic device.

When using an electronic device such as an artificial intelligence (artificial intelligence, AI) terminal, a smartphone, a tablet computer, a smartwatch, and a smart band, a user often switches between two applications. Refer to FIG. 1. Using a first application and a second application as an example, a possible switching behavior includes: before a moment t0, the first application displays an interface on a screen of an electronic device. In this case, the first application is used as a foreground application. At the moment t0, the electronic device switches the foreground application from the first application to the second application in response to a user operation. In this case, the second application is used as the foreground application, and the first application changes from the foreground application to a background application. At a moment t1, the electronic device switches the foreground application from the second application back to the first application in response to another user operation. In this case, the first application is used as the foreground application again, and the second application changes from the foreground application to the background application. The "user operation" may be a gesture operation, a tap operation, or the like performed by a user on the screen of the electronic device.

Figure 2:
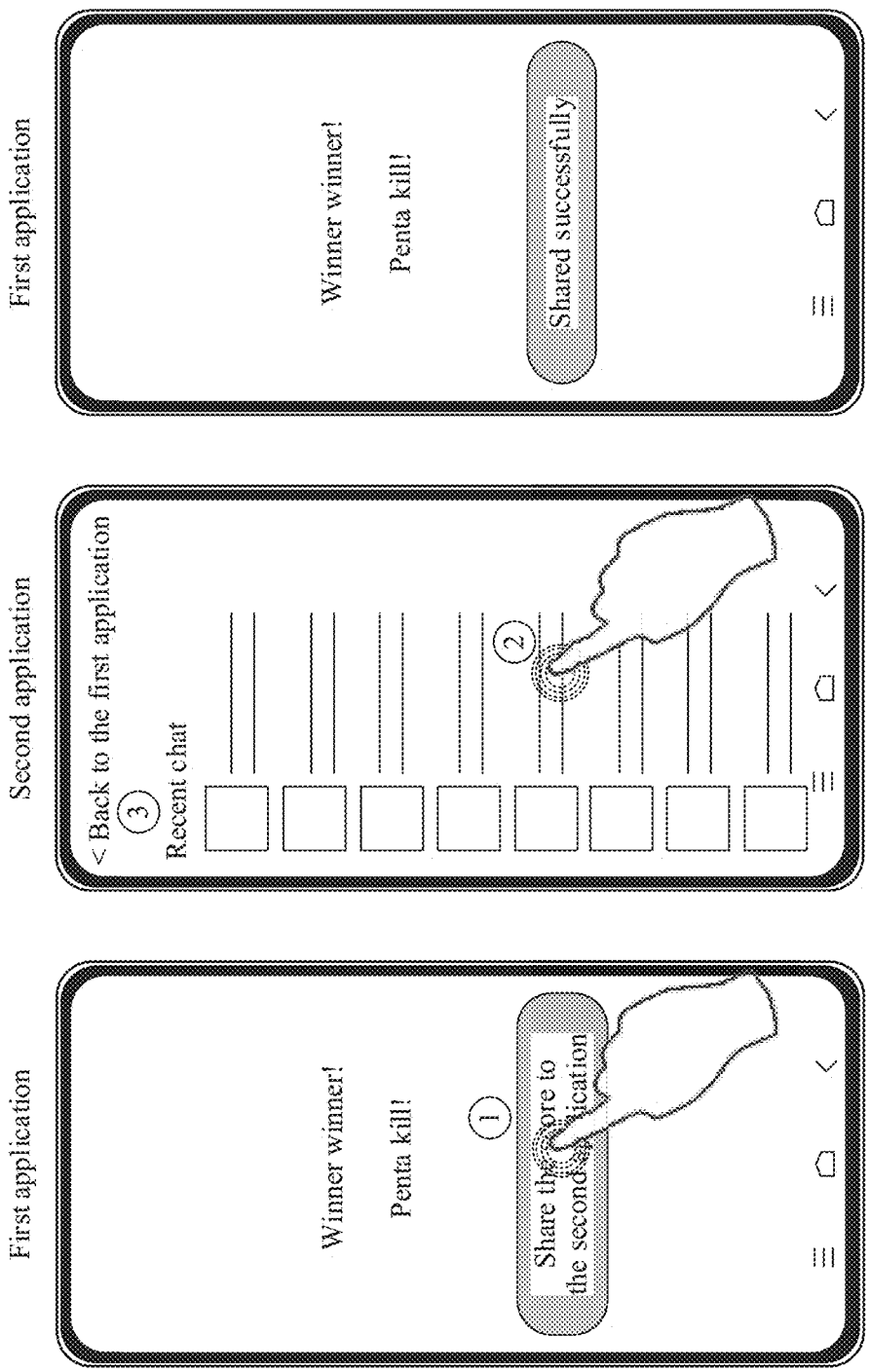
FIG. 2 shows an application switching scenario.

The switching behavior shown in FIG. 1 may occur, for example, in the following scenarios:

Example scenario 1: As shown in FIG. 2, a first application is a game, and a second application is social software. When a user plays the game (a foreground application is the first application), if the user wants to share a game score with a friend, or wants to invite a friend to play the game together, the user uses a sharing function in the game (the first application). For example, if the user taps "Share the score to the second application" in the game (the first application) ①, the first application immediately switches to the background, and the second application simultaneously wakes up and switches to the foreground (that is, the foreground application switches from the first application to the second application). After the second application is switched to the foreground, a friend list is displayed, and the user may share the game score to a friend by performing an operation such as selecting on the friend list ②. Then, when the user taps "Back to the first application" in the second application ③, the second application immediately switches to the background, and the first application simultaneously wakes up and switches to the foreground (that is, the foreground application switches from the second application back to the first application), so that the user can continue playing the game.

Figure 3:
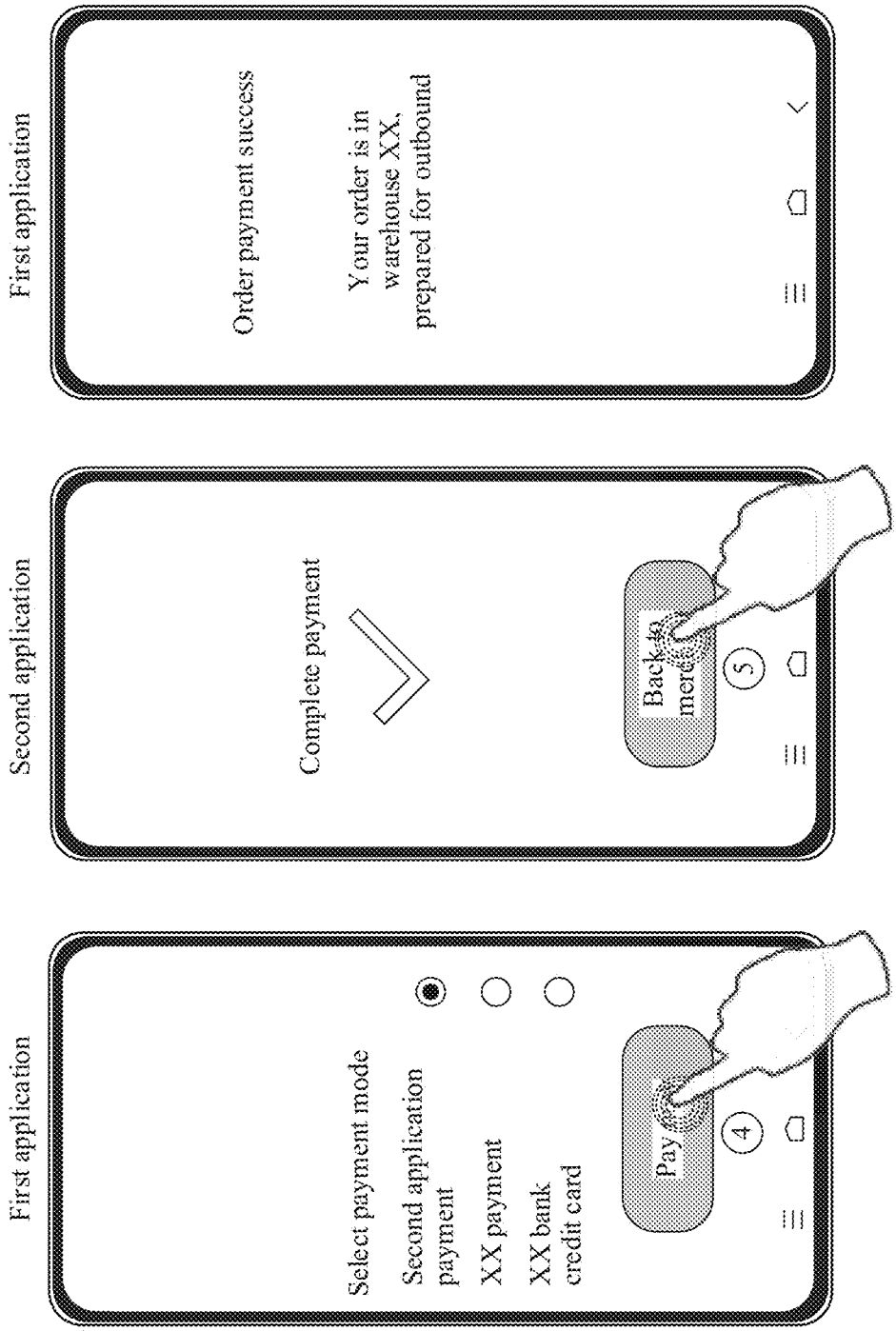
FIG. 3 shows another application switching scenario.

Example scenario 2: As shown in FIG. 3, a first application is a shopping application, and a second application is a payment application. When a user uses the first application to place an order for shopping (a foreground application is the first application), if the user selects to use the second application for payment, the first application wakes up the second application and the second application switches to the foreground (that is, the foreground application switches from the first application to the second application) ④. When the user completes a payment operation in the second application and taps "Back to merchant" ⑤, the second application immediately switches to the background, and simultaneously the first application wakes up and switches to the foreground (that is, the foreground application switches from the second application to the first application), so that the user can view the order or continue shopping.

Figure 4:
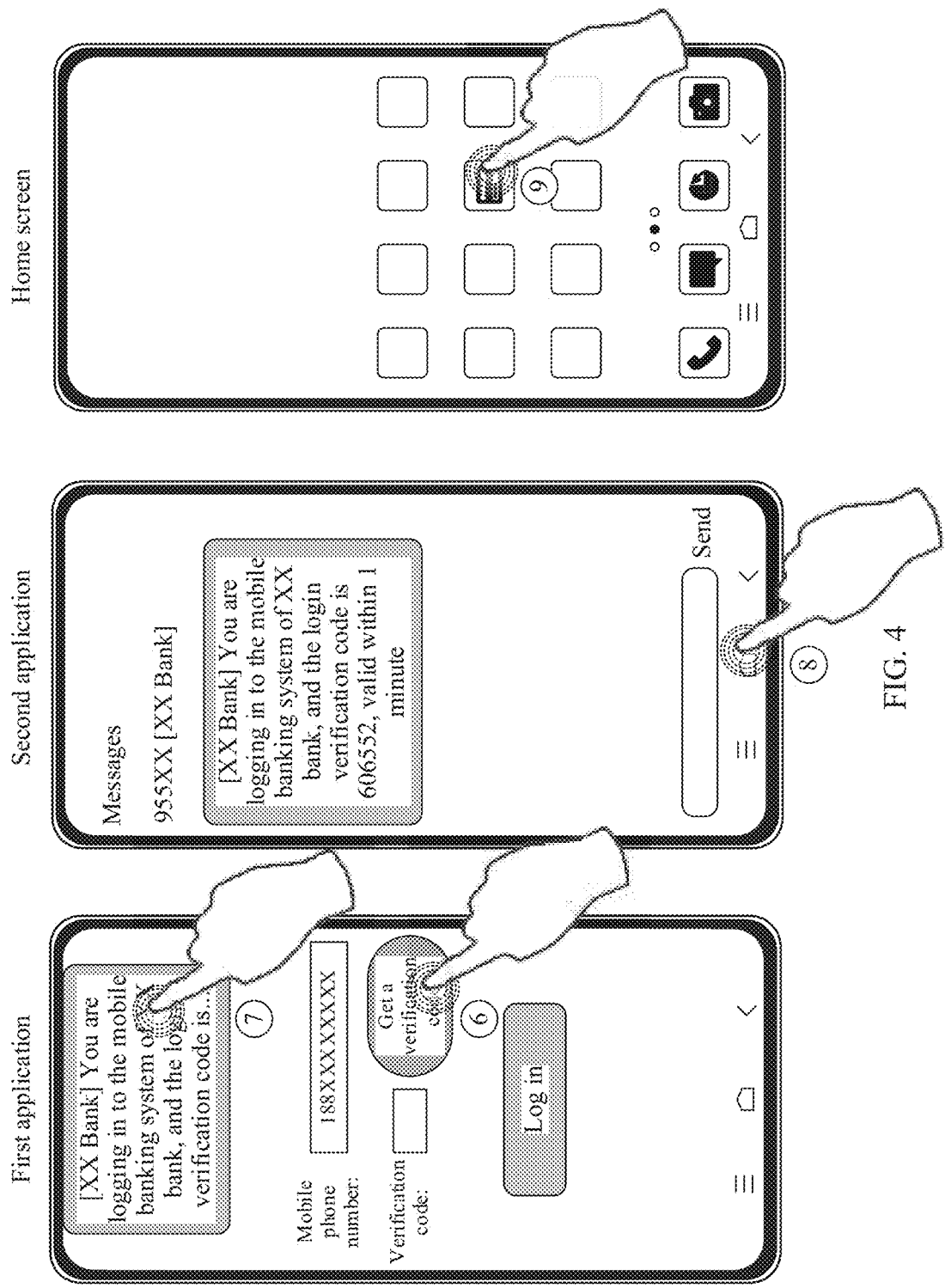
FIG. 4 shows still another application switching scenario.

Example scenario 3: As shown in FIG. 4, a first application is a bank application that needs to be logged in to by using an SMS verification code, and a second application is a Messages application. After a user enters a mobile phone number on a login interface of the first application and taps "Get a verification code" ⑥, if the user receives an SMS verification code, an electronic device pops up a message on a navigation bar at the top of a display. When the user taps the pop-up message ⑦, the electronic device switches a foreground application from the first application to the second application. After recording the SMS verification code, the user may tap a home screen button (or perform a gesture operation) on the display to back to the home screen ⑧. Then, the user taps an icon of the first application on the home screen to back to the first application ⑨. Alternatively, the user may tap a multitask button (or perform a gesture operation) on the display to enter a multitask list, and then taps an icon of the first application in the multitask list to back to the first application.

It should be additionally noted that, in addition to the foregoing scenarios shown in embodiments of this application, the switching behavior shown in FIG. 1 may alternatively occur in another scenario. For example, a user logs in to a non-instant messaging IM application by using an IM account, invokes a Phone application to make a call to a merchant in an application such as a take-out application or a group buying application, views a route map in a map application, shares a route with a friend in a social application, or the like. Due to space limitation, another scenario is not specifically described herein in embodiments of this application. It should be understood that, in a process in which the user uses the electronic device, any scenario in which applications are switched to a foreground application according to "first application→ second application→ first application" falls within the discussion scope of embodiments of this application.

It should be additionally noted that, in a switching scenario of "first application→ second application→ first application", the first application and the second application may be switched in a direct switching manner, or may be switched in an indirect switching manner. The direct switching means directly switching from the first application to the second application, or directly switching from the second application to the first application without using any transition application. The indirect switching means: first switching from the first application to a transition application, and then switching from the transition application to the second application, or first switching from the second application to the transition application, and then switching from the transition application to the first application. The transition application may include, for example, a home screen (desktop) application, a multitask window application, and a notification bar application.

It may be understood that, regardless of whether an application runs in the foreground or in the background, the application consumes system resources of the electronic device, for example, a processor resource and a random access memory (random access memory, RAM) resource. Because system resources of the electronic device are limited, when a background application occupies a relatively large quantity of system resources, the electronic device cannot schedule sufficient system resources for a foreground application. Consequently, interface freezing, slow response, and the like occur in the foreground application. In an electronic device with low processor performance and a small RAM capacity, a background application competes for system resources with a foreground processor more severely, and the foreground application is more likely to freeze and respond slowly, Therefore, to ensure smooth running of the foreground application, when available system resources are insufficient, the electronic device clears the background application by using some mechanisms, for example, ending a system process of the background application to release system resources, or freezing the background application to prevent an activity behavior of the background application from occupying system resources.

In this embodiment of this application, that the system resources of the electronic device are insufficient may include: available memory RAM of the electronic device is insufficient, for example, lower than a preset memory threshold; and/or processor usage of the electronic device is excessively high, for example, higher than a preset usage threshold; and/or power consumption of the electronic device is excessively high, for example, higher than a preset power consumption threshold; and the like.

The following uses an example in which an electronic device runs an Android system to describe a mechanism for clearing a background application by the electronic device.

It may be understood that this embodiment of this application may also be applied to an electronic device running another operating system, for example, an iOS system, an iPad OS system, a Windows mobile system, a Linux system, a Windows system, or a Harmony OS (Harmony OS) system.

A low memory killer (low memory killer, LMK) mechanism of the Android system configures different keepalive priorities (adjustments, ADJ) for applications based on different applications and application states. When system resources are insufficient, the system scans and kills background applications in ascending order of keepalive priorities, that is, ends application processes, until sufficient system resources are released for the foreground application to run.

Table 1 shows a solution for configuring keepalive priorities for different applications and application states.

TABLE 1

| Keepalive priority | Definition | Priority value |
| --- | --- | --- |
| NATIVE_ADJ | Native process | −1000 |
| SYSTEM_ADJ | Indicates only a system_server process | −900 |
| PERSISTENT_PROC_ADJ | System persistent process | −800 |
| PERSISTENT_SERVICE_ADJ | Associated with a system or persistent process | −700 |
| FOREGROUND_APP_ADJ | Foreground process | 0 |
| VISIBLE_APP_ADJ | Visible process | 100 |
| PERCEPTIBLE_APP_ADJ | Perceptible process, for example, music playing in the background | 200 |
| BACKUP_APP_ADJ | Backup process | 300 |
| HEAVY_WEIGHT_APP_ADJ | Heavyweight process | 400 |
| SERVICE_ADJ | Service process | 500 |
| HOME_APP_ADJ | Home screen process | 600 |
| PREVIOUS_APP_ADJ | Previous process | 700 |
| SERVICE_B_ADJ | Service process in B List | 800 |
| CACHED_APP_MIN_ADJ | Minimum adj value of a background process | 900 |
| CACHED_APP_MAX_ADJ | Maximum adj value of an invisible process | 906 |

As shown in Table 1, a keepalive priority may be represented by a priority value of the keepalive priority, and a priority value of each keepalive priority may be predefined. In an implementation, a smaller priority value indicates a higher keepalive priority, and a larger priority value indicates a lower keepalive priority.

In the Android system, when the first application is the foreground application, a keepalive priority configured by the system for the foreground application is FOREGROUND_APP_ADJ. When the foreground application is switched from the first application to the second application, the keepalive priority configured by the system for the foreground application is PREVIOUS_APP_ADJ, which is lower than FOREGROUND_APP_ADJ. When the foreground application is switched from the second application to the first application, if the foreground application does not directly switch from the second application to the first application, but experiences a transition application such as a home screen application, a multitask list application, or a notification bar, when the foreground application is switched from the second application to the transition application, the system may adjust the keepalive priority of the first application to a lowest CACHED_APP_MIN_ADJ or CACHED_APP_MAX_ADJ, which is referred to as CACHED below. When the keepalive priority of the first application running in the background is CACHED or PREVIOUS_APP_ADJ, because the priority is very low, the first application is likely to be scanned and killed by the LMK mechanism when system resources are insufficient. As a result, when the foreground application is switched from the second application to the first application, the first application needs to be restarted and load resources, and a previous progress is lost, which severely reduces user experience.

Figure 5:
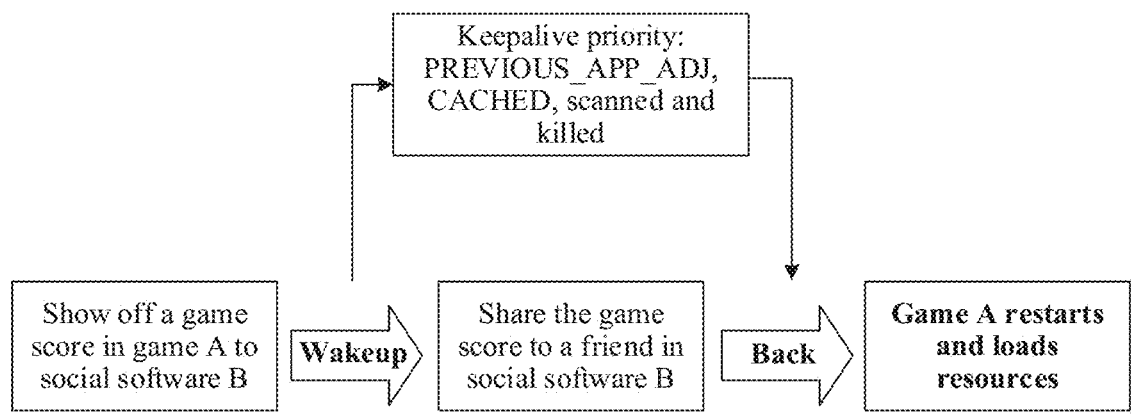
FIG. 5 is a schematic diagram of a scenario in which an electronic device kills a background application.

The foregoing example scenario 1 is used as an example. As shown in FIG. 5, after completing a game, the user wakes up social software B in a game A, and a keepalive priority of the game A is adjusted to PREVIOUS_APP_ADJ. After that, if the user opens some transition applications, the keepalive priority of the game A further decreases to CACHED. When the game A runs in the background, if the system resources of the electronic device are insufficient, the LMK mechanism may kill the game A. When the user finishes sharing the game score in the social software B and switches the foreground application back to the game A, if the game A has been killed, the game A restarts, loads game resources, and logs in, and a previous game progress is lost, which severely reduces user experience.

The foregoing example scenario 3 is used as an example. If the bank application is killed by the LMK mechanism in the background, when the foreground application is switched from the Messages application back to the bank application, the bank application needs to be restarted, so that the previously received SMS verification code becomes invalid. As a result, the user cannot complete a login process.

It can be learned that currently, there is still a disadvantage in a background application scanning and killing mechanism of an electronic device in a system. As a result, a background application that should not be cleared is scanned and killed, and user experience when the user performs an application switching operation is reduced.

To resolve the foregoing technical problem, an embodiment of this application provides an application keepalive method. The method may be applied to various electronic devices, for example, an artificial intelligence AI terminal, a smartphone, a tablet computer, a smartwatch, and a smart band. The artificial intelligence AI terminal may be, for example, an AI sound box, an AI robot, and an electrical appliance, an industrial device, a vehicle, an airplane, or a ship that has an AI function.

Figure 6:
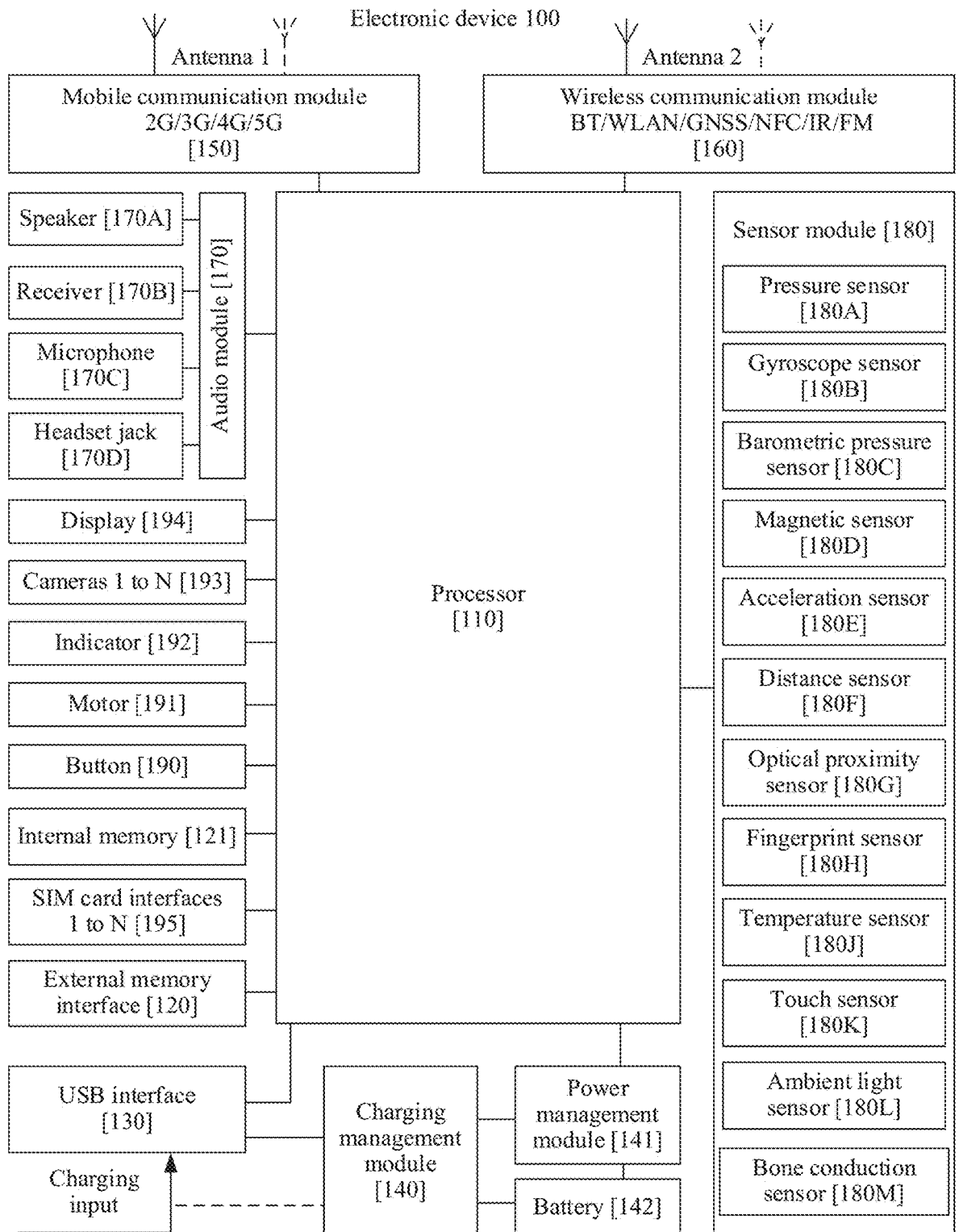
FIG. 6 is a schematic diagram of a structure of an electronic device according to an embodiment of this application.

FIG. 6 is a schematic diagram of a structure of an electronic device 100 according to an embodiment of this application. As shown in FIG. 6, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a GPU, an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110, If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in this embodiment is merely used as an example for description, and does not constitute a limitation on a structure of the electronic device 100. In some other embodiments, the electronic device 100 may alternatively use an interface connection manner different from an interface connection manner in the foregoing embodiment, or use a combination of a plurality of interface connection manners.

The charging management module 140 is configured to receive a charging input from the charger. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194.

The wireless communication module 160 may provide a solution, applied to the electronic device 100, to wireless communication including a wireless local area network (wireless local area network, WLAN) (for example, a wireless fidelity (wireless fidelity, network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like.

The display 194 in this embodiment of this application may be a touchscreen. In other words, the touch sensor 180K is integrated in the display 194. The touch sensor 180K may also be referred to as a "touch panel". To be specific, the display 194 may include a display panel and a touch panel. The touch sensor 180K and the display 194 form a touchscreen, which is also referred to as a "touch screen". The touch sensor 180K is configured to detect a touch operation performed on or near the touch sensor. After the touch sensor 180K detects the touch operation, a driver (for example, a TP driver) at a kernel layer may transfer the touch operation to an upper layer, to determine a touch event type. A visual output related to the touch operation may be provided through the display 194. In some other embodiments, the touch sensor 180K may also be disposed on a surface of the electronic device 100 at a location different from that of the display 194.

The electronic device 100 may implement an image shooting function by using the ISP, the camera 193, the video codec, the GPU, the display 194, the application processor, and the like. The ISP is configured to process data fed back by the camera 193. The camera 193 is configured to capture a static image or a video. The digital signal processor is configured to process a digital signal, and may process another digital signal in addition to the digital image signal. The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card. The internal memory 121 may be configured to store computer-executable program code. The executable program code includes instructions. The processor 110 runs the instructions stored in the internal memory 121, to perform various function applications of the electronic device 100 and data processing. For example, in this embodiment of this application, the processor 110 may execute the instructions stored in the internal memory 121, and the internal memory 121 may include a program storage area and a data storage area. The program storage area may store an operating system, an application required by at least one function (for example, a sound playing function or an image playing function), and the like. The data storage area may store data (for example, audio data and a phone book) and the like created during use of the electronic device 100. In addition, the internal memory 121 may include a high-speed random access memory, or may include a nonvolatile memory such as at least one disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. The speaker 170A, also referred to as a "loudspeaker", is configured to convert an audio electrical signal into a sound signal. The receiver 170B, also referred to as an "earpiece", is configured to convert an electrical audio signal into a sound signal. The microphone 170C, also referred to as a "mike" or a "mic", is configured to convert a sound signal into an electrical signal. The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. In this embodiment of this application, the electronic device 100 may obtain pressure of the touch operation of the user by using the pressure sensor 180A.

The button 190 includes a power button, a volume button, and the like. The button 190 may be a mechanical button, or may be a touch button. The electronic device 100 may receive a button input, and generate a button signal input related to a user setting and function control of the electronic device 100. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like.

Figure 7:
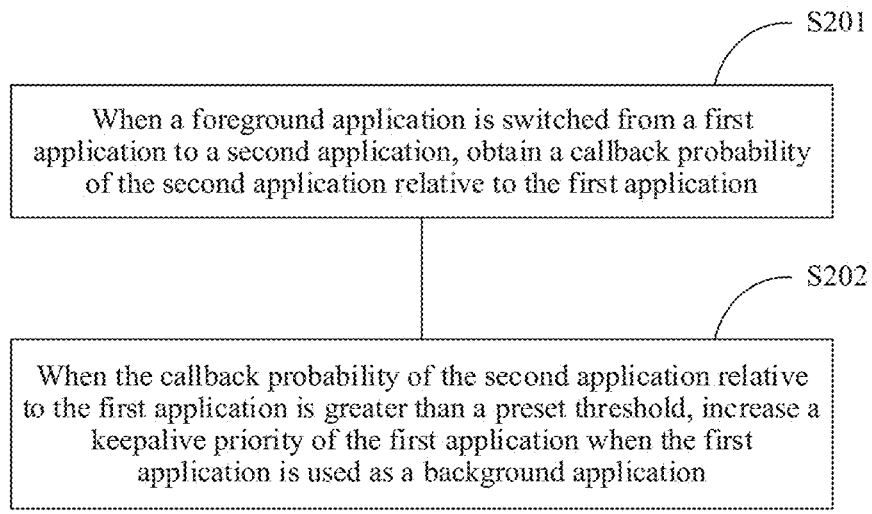
FIG. 7 is a flowchart of an application keepalive method according to an embodiment of this application.

FIG. 7 is a flowchart of an application keepalive method according to an embodiment of this application. The method may be implemented by the electronic device 100 having the foregoing hardware structure. As shown in FIG. 7, the method may include the following steps.

Step S201: When a foreground application is switched from a first application to a second application, obtain a callback probability of the second application relative to the first application.

Generally, when an electronic device runs, a sequence in which foreground applications are switched and how long each application runs in the foreground are determined based on a user's intent. For example:

Intent (1): If a user expects to use the second application for long time after switching the foreground application from the first application to the second application, the second application runs in the foreground for long time.

Intent (2): If the user expects to temporarily use the second application after switching the foreground application from the first application to the second application, and immediately switches back to the first application after temporarily using the second application, the second application runs in the foreground for short time. The intent (2) may correspond to the foregoing example scenarios shown in this embodiment of this application. For example, in the foregoing example scenario 1, when the user switches from the first application to the second application, the user expects to back to the first application immediately after sharing the game score with a friend to continue the game. Therefore, the second application runs in the foreground for short time, usually within a dozen of seconds.

Figure 8:
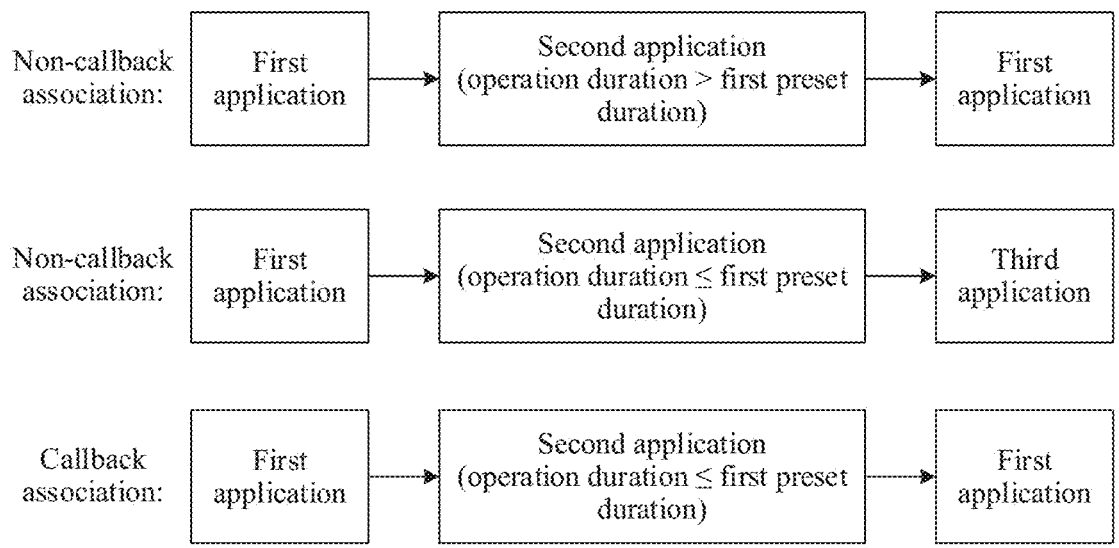
FIG. 8 is a schematic diagram of a callback association concept according to an embodiment of this application.

It can be learned that, in the foregoing "first application-second application-first application" switching scenario, duration of running the second application in the foreground may reflect an intent of the user. If the intent of the user is different, the duration of running the second application in the foreground is also different. Therefore, in this embodiment of this application, what is defined is that a concept of "callback association" exists in a process of switching between the first application and the second application. Specifically, as shown in FIG. 8, if the foreground application is switched back from the second application to the first application within first preset duration after the foreground application is switched from the first application to the second application, it is considered that one callback association occurs between the first application and the second application. If the foreground application is not switched from the second application back to the first application within the first preset duration after the foreground application is switched from the first application to the second application, even if the foreground application is later switched from the second application back to the first application, it is considered that no callback association occurs between the first application and the second application. The first preset duration may be an empirical value, for example, 3 min (minutes) or 5 min.

It can be learned from the foregoing description of the concept of "callback association" that, if a callback association occurs between the first application and the second application, it may reflect that the user has the intent (2) or if no callback association occurs between the first application and the second application, it may reflect that the user has the intent (1). Therefore, in this embodiment of this application, the intent of the user is associated with the method in this embodiment of this application by using the concept of "callback association".

Based on the foregoing concept of "callback association", this application defines a callback probability of an application relative to another application. A callback probability of the second application relative to the first application is a probability that the foreground application is switched from the second application back to the first application within the first preset duration after the foreground application is switched from the first application to the second application.

During specific implementation, the electronic device may collect statistics on switching times of switching the foreground application from the first application to the second application in a historical time period, and collect statistics on callback times of the second application relative to the first application in the historical time period. A ratio of the callback times of the second application relative to the first application to the switching times num_total of switching the foreground application from the first application to the second application is used as the callback probability of the second application relative to the first application, that is:

$$\text{callback\_rate}(A, B) = \frac{\text{num\_callback}(A, B)}{\text{num\_total}(A, B)} \qquad 1$$

In the foregoing formula ①, A represents the first application, B represents the second application, callback_rate(A, B) represents the callback probability of the second application relative to the first application, num_callback(A, B) represents the callback times of the second application relative to the first application in the historical time period, and num_total(A, B) represents the switching times of the foreground application from the first application to the second application in the historical time period.

Step S202: When the callback probability of the second application relative to the first application is greater than a preset threshold, increase a keepalive priority of the first application when the first application is used as a background application.

It may be understood that a higher callback probability of the second application relative to the first application indicates a higher probability that the foreground application is switched from the second application back to the first application within the first preset duration after the foreground application is switched from the first application to the second application, and a lower callback probability of the second application relative to the first application indicates a lower probability that the foreground application is switched from the second application back to the first application within the first preset duration after the foreground application is switched from the first application to the second application.

Based on the foregoing understanding, in this embodiment of this application, a threshold is preset for the callback probability. The threshold may be an empirical value, for example, 30%, or 40%, When the callback probability of the second application relative to the first application is greater than the threshold, there is a relatively high probability that the user currently has the intent (2). Therefore, the electronic device increases the keepalive priority of the first application, so that the first application is not likely to be scanned and killed by the LMK mechanism in the background. Therefore, when the user switches the foreground application from the second application back to the first application, the first application can continue to run in the foreground in a state before being switched to the background for running. In this way, operations of the user on the first application can be seamlessly connected, and user experience is improved. When the callback probability of the second application relative to the first application is less than or equal to the threshold, there is a relatively high probability that the user currently has the intent (1). Therefore, the electronic device does not specially adjust the keepalive priority of the first application. When available system resources of the electronic device are relatively low, the first application may be scanned and killed by the LMK mechanism, to release system resources, prevent system freezing, and improve user experience.

During specific implementation of step S202 in this embodiment of this application, a new keepalive priority, for example, CALLBACK_APP_ADJ, is defined. The new keepalive priority may be interpreted as a callback process, and corresponds to the first priority in the claims. CALLBACK_APP_ADJ is higher than PREVIOUS_APP_ADJ and lower than FOREGROUND_APP_ADJ.

Table 2 shows a configuration solution including a keepalive priority of CALLBACK_APP_ADJ.

TABLE 2

| Keepalive priority | Definition | Priority value |
|---|---|---|
| NATIVE_ADJ | Native process | −1000 |
| SYSTEM_ADJ | Indicates only a system_server process | −900 |
| PERSISTENT_PROC_ADJ | System persistent process | −800 |
| PERSISTENT_SERVICE_ADJ | Associated with a system or persistent process | −700 |
| FOREGROUND_APR_ADJ | Foreground process | 0 |
| VISIBLE_APP_ADJ | Visible process | 100 |
| PERCEPTIBLE_APP_ADJ | Perceptible process, for example, music playing in the background | 200 |
| CALLBACK_APP_ADJ | Callback process | 290 |
| BACKUP_APP_ADJ | Backup process | 300 |
| HEAVY_WEIGHT_APP_ADJ | Heavyweight process | 400 |
| SERVICE_ADJ | Service process | 500 |
| HOME_APP_ADJ | Home screen process | 600 |
| PREVIOUS_APP_ADJ | Previous process | 700 |
| SERVICE_B_ADJ | Service process in B List | 800 |
| CACHED_APP_MIN_ADJ | Minimum adj value of a background process | 900 |
| CACHED_APP_MAX_ADJ | Maximum adj value of an invisible process | 906 |

As shown in Table 2, the priority value of CALLBACK_APP_ADJ is set to, for example, 290, which is higher than that of BACKUP_APP_ADJ, HEAVY_WEIGHT_APP_ADJ, SERVICE_ADJ, HOME_APP_ADJ, PREVIOUS_APP_ADJ, and the like.

Generally, when the foreground application is switched from the first application to the second application, the system sets the keepalive priority of the first application to PREVIOUS_APP_ADJ by default, which corresponds to the default priority in the claims. The priority value of PREVIOUS_APP_ADJ is only 700, and is only slightly higher than that of SERVICE_B_ADJ and CACHED. When the system resources of the electronic device are insufficient, the first application is likely to be scanned and killed by the LMK mechanism.

In this embodiment of this application, when the foreground application is switched from the first application to the second application, if the callback probability of the second application relative to the first application is greater than the preset threshold, the electronic device may directly increase the keepalive priority of the first application used as the background application from the default PREVIOUS_APP_ADJ to CALLBACK_APP_ADJ. The priority value of CALLBACK_APP_ADJ may be, for example, 290, and is higher than priorities of many processes. When the system resources are insufficient, the LMK mechanism scans and kills, in ascending order of keepalive priority, processes whose keepalive priorities are CACHED_APP_MAX_ADJ, CACHED_APP_MIN_ADJ, SERVICE_B_ADJ, PREVIOUS_APP_ADJ, and the like, until sufficient system resources are released. It can be learned that because a keepalive priority of the second application is higher than that of many other processes such as the backup process, the service process, and the home screen process, the second application is not likely to be killed by the LMK mechanism.

According to the foregoing technical solutions, when the user switches the foreground application of the electronic device from the first application to the second application, the electronic device obtains the callback probability of the second application relative to the first application. When the callback probability of the second application relative to the first application is greater than the preset threshold, the electronic device increases the keepalive priority of the first application when the first application is used as the background application, so that the second application is not killed by the LMK mechanism in the background. Therefore, when the user switches the foreground application from the second application back to the first application, the first application can continue to run in the foreground in a state before being switched to the background for running. In this way, operations of the user on the first application can be seamlessly connected. This meets a user's intent to continue using the first application, and improves user experience.

Figure 9:
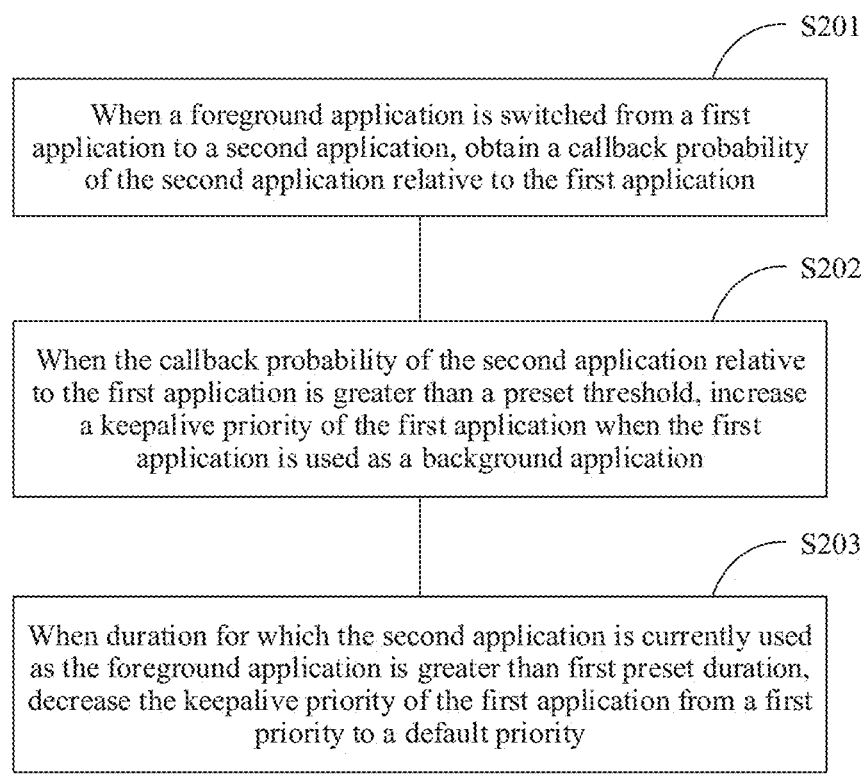
FIG. 9 is another flowchart of an application keepalive method according to an embodiment of this application.

Refer to FIG. 9. In an optional implementation, the application keepalive method provided in this embodiment of this application may further include the following step:

Step S203: When duration for which the second application is currently used as the foreground application is greater than the first preset duration, decrease the keepalive priority of the first application from the first priority to the default priority.

It may be understood that, when the duration for which the second application is currently used as the foreground application is greater than the first preset duration, there is no callback association between the first application and the second application, which means that the user may need to use the second application as the foreground application for long time. In this case, the electronic device does not need to perform additional protection on the first application. Therefore, the electronic device may decrease the keepalive priority of the first application from CALLBACK_APP_ADJ to the default PREVIOUS_APP_ADJ, so that when the system resources are insufficient, the first application is likely to be scanned and killed by the LMK mechanism, to release the system resources.

Figure 10:
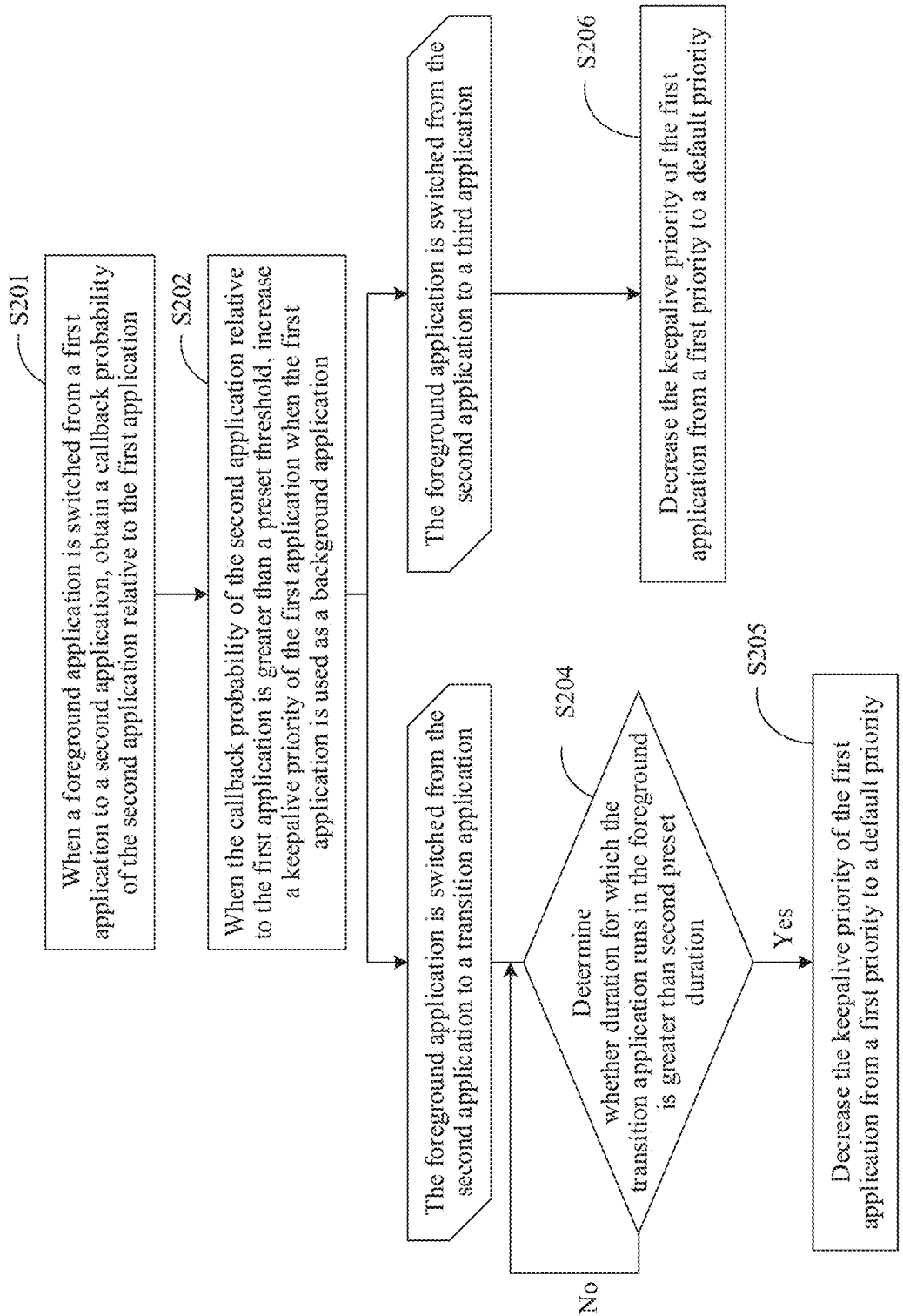
FIG. 10 is still another flowchart of an application keepalive method according to an embodiment of this application.

Refer to FIG. 10. In an optional implementation, the application keepalive method provided in this embodiment of this application may further include the following steps.

Step S204: When the foreground application is switched from the second application to a transition application, determine whether duration for which the transition application runs in the foreground is greater than second preset duration.

Step S205: When the duration for which the transition application runs in the foreground is greater than the second preset duration, decrease the keepalive priority of the first application from the first priority to the default priority.

In this embodiment of this application, the transition application may include, for example, a home screen application (a system desktop), a multitask window application, and a notification bar application. In the Android system, the foregoing transition application generally belongs to a launcher process and a systemUI process (including a systemUI_navThread subprocess, a system_UI_statusBar subprocess, and the like) of the system.

Generally, the user may switch the foreground application from the second application to the first application in two different operation manners. This depends on a usage habit of the user. A first operation manner may be as follows: The user directly returns the first application from the second application to the foreground by using an application programming interface API provided by the system of the electronic device. A second operation manner may be as follows: The user first switches the foreground application from the second application to the transition application, and then switches the foreground application from the transition application to the first application. For example, after sharing the game score in the social application (the second application), the user may first tap a home screen button (home button) on the display of the electronic device to switch the foreground application from the social application to the home screen application, and then tap an icon of the game application (the first application) on the home screen to switch the foreground application from the home screen application to the game application.

It may be understood that when the user switches the foreground application from the second application to a transition application, if a real intent of the user is to switch the first application back to the foreground by using the transition application for continuous use, the user stays in the transition application for very short time. Therefore, in this embodiment of this application, when the foreground application is switched from the second application to a transition application, it is determined whether duration for which the transition application runs in the foreground is greater than the second preset duration. If the duration for which the transition application runs in the foreground is greater than the second preset duration, it means that the user does not want to switch back to the first application. Therefore, the electronic device may decrease the keepalive priority of the first application from CALLBACK_APP_ADJ to the default PREVIOUS_APP_ADJ, so that when the system resources are insufficient, the first application is more likely to be scanned and killed by the LMK mechanism, to release the system resources.

Further refer to FIG. 10. In an optional implementation, the application keepalive method provided in this embodiment of this application may further include the following step:

Step S206: When the foreground application is switched from the second application to a third application, decrease the keepalive priority of the first application from the first priority to the default priority, where the third application is not a transition application.

When the foreground application is switched from the second application to the third application, it indicates that there is no callback association between the first application and the second application that are switched this time. In this case, the electronic device does not need to perform special protection on the first application. Therefore, the electronic device may decrease the keepalive priority of the first application from CALLBACK_APP_ADJ to the default PREVIOUS_APP_ADJ so that when the system resources are insufficient, the first application is more likely to be scanned and killed by the LMK mechanism, to release the system resources. The switching of the foreground application from the second application to the third application may be implemented in a direct switching manner, or may be implemented in an indirect switching manner.

Figure 11:
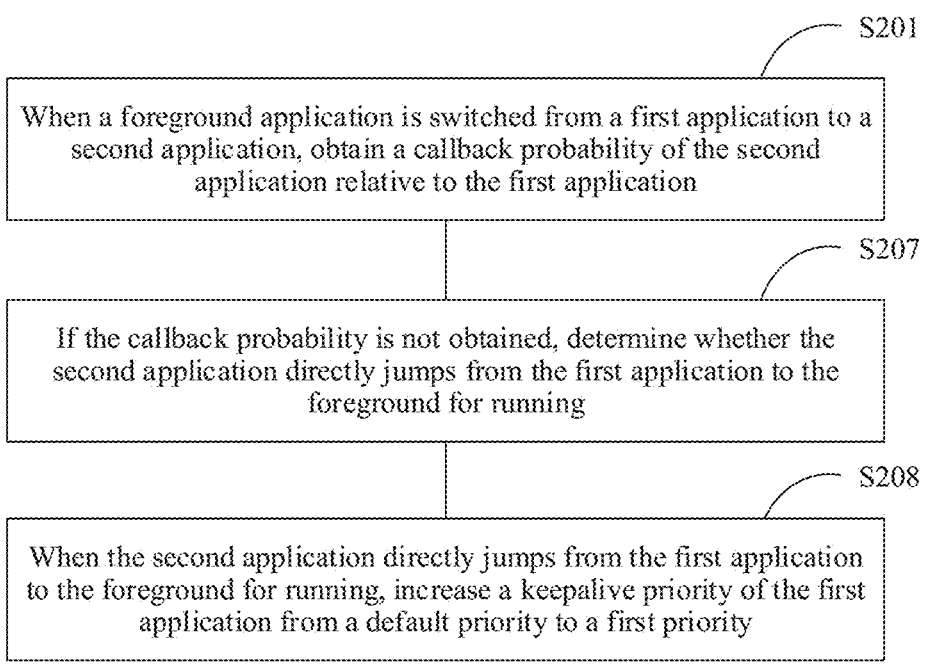
FIG. 11 is yet another flowchart of an application keepalive method according to an embodiment of this application.

Refer to FIG. 11. In an optional implementation, the application keepalive method provided in this embodiment of this application may further include the following steps.

Step S207: When the foreground application is switched from the first application to the second application, if the callback probability is not obtained, determine whether the second application directly jumps from the first application to the foreground for running.

It may be understood that when the foreground application is switched from the first application to the second application for the first time, the electronic device may not collect statistics on the callback probability of the second application relative to the first application. In this case, the electronic device determines whether the second application directly jumps from the first application to the foreground for running. The direct jumping means that no transition application is used in a process of switching the foreground application from the first application to the second application.

Step S208: When the second application directly jumps from the first application to the foreground for running, increase the keepalive priority of the first application from a default priority to a first priority.

If the second application directly jumps from the first application to the foreground for running, it indicates that there is a relatively high probability that the first application and the second application have a callback association. For example, in actual use, the foregoing example scenario 1 and example scenario 2 are usually reproduced in a direct jumping manner. Therefore, in this case, when the first application is used as the background application, the electronic device may directly increase the keepalive priority of the first application from the default PREVIOUS_APP_ADJ to CALLBACK_APP_ADJ, to prevent the first application from being scanned and killed by the LMK mechanism in the background.

Figure 12:
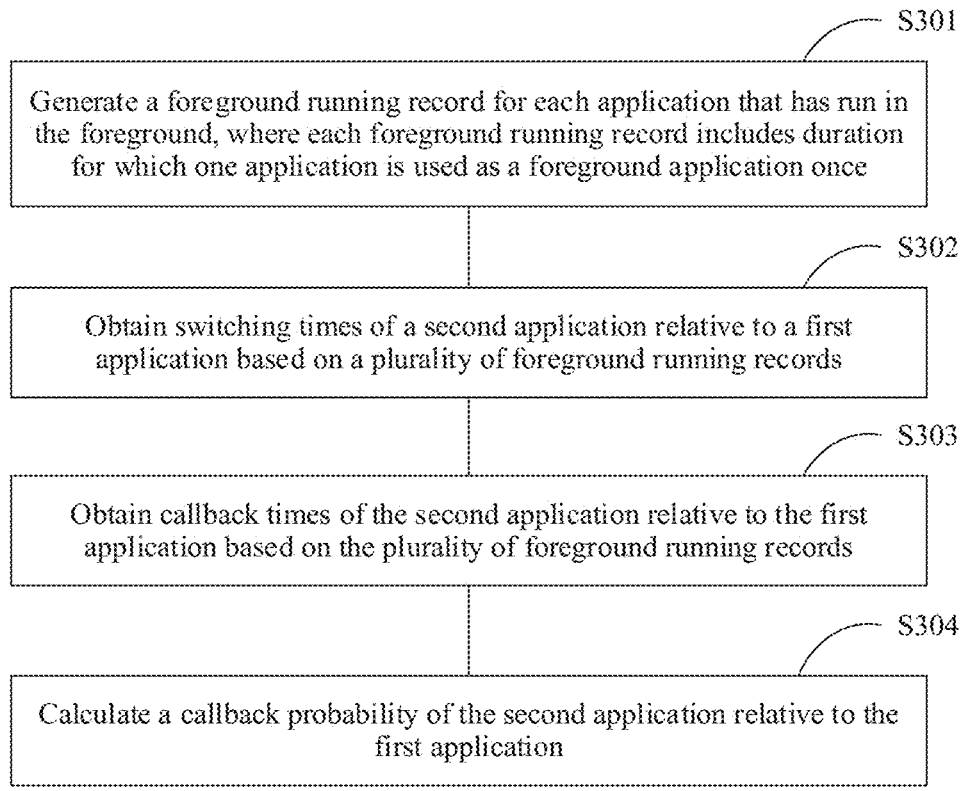
FIG. 12 is a flowchart of obtaining a callback probability of an application relative to another application according to an embodiment of this application.

An embodiment of this application further provides a method for obtaining a callback probability of an application relative to another application. As shown in FIG. 12, the method may specifically include the following steps.

Step S301: Generate a foreground running record for each application that has run in the foreground, where each foreground running record includes duration for which one application is used as a foreground application once.

Figure 13:
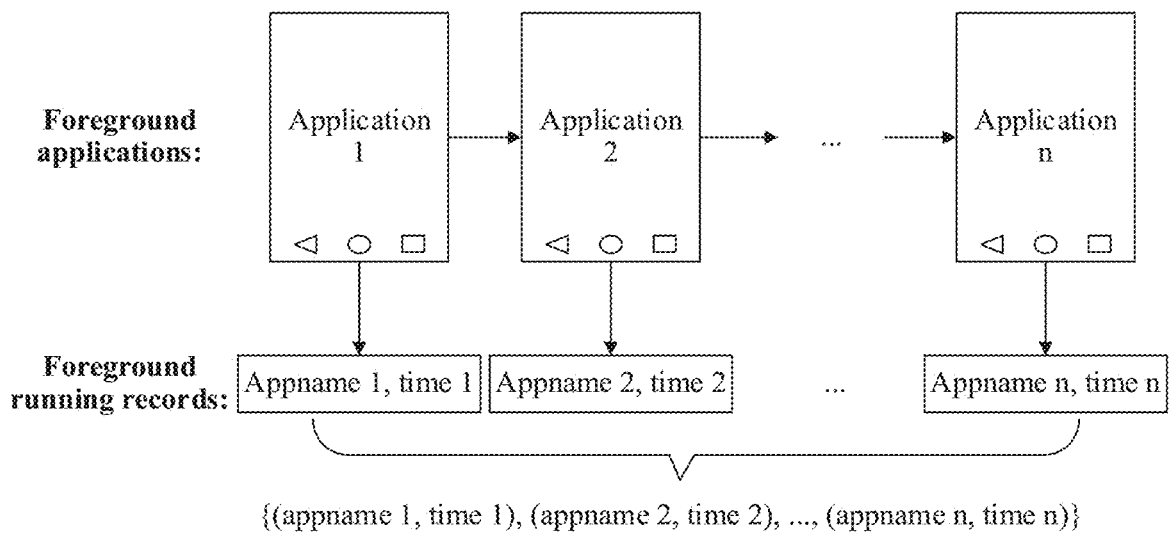
FIG. 13 is a schematic diagram in which an electronic device collects statistics on foreground running records of applications in a historical time period.

During specific implementation, as shown in FIG. 13, an electronic device may collect, within a historical time period, statistics on duration of each application running in the foreground each time, and then generate, based on statistics data, a foreground running record for each application that has run in the foreground. Each time the application runs in the foreground, the electronic device correspondingly generates a foreground running record. Each foreground running record may include an application name of an application and duration in which the application is used as a foreground application once, for example, (appname, time), where appname is the application name, and time is the duration. When a plurality of foreground running records are generated, the plurality of foreground running records are sorted according to a time sequence of running applications corresponding to the plurality of foreground running records in the foreground, for example, {(appname 1, time 1), (appname 2, time 2), . . . , (appname n, time n)}.

In an optional implementation, the electronic device may start to generate the foreground running record after an operating system of the electronic device is activated, so that in a process in which a user uses the electronic device, the electronic device continuously generates a new foreground running record over time, to track a usage habit of the user. In addition, the electronic device may further actively delete some foreground running records generated long time ago, so as to track only a recent usage habit of the user, for example, delete a foreground running record generated one month ago, or delete a foreground running record generated three months ago.

In an optional implementation, the electronic device ignores behavior of running transition applications such as the home screen application, the multitask window application, and the notification bar application in the foreground, and does not generate foreground running records of the transition applications such as the home screen application, the multitask window application, and the notification bar application, to avoid interference to calculation of a quantity of callback times between applications, and reduce a quantity of foreground running records.

Figure 14:
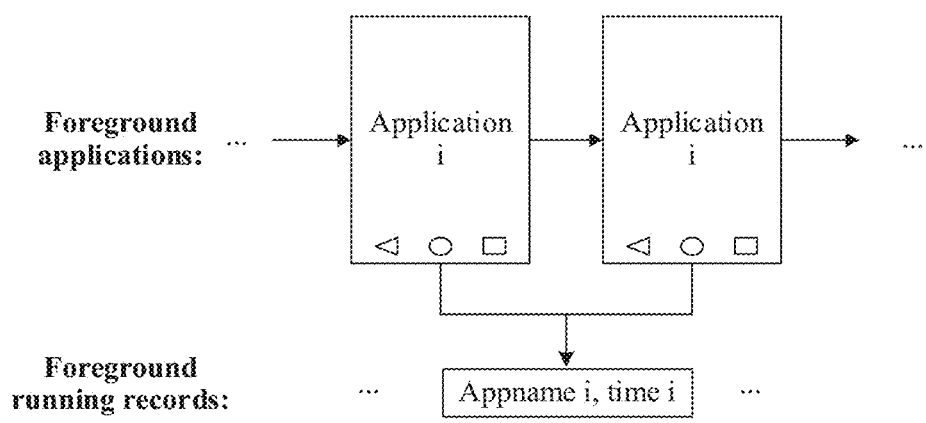
FIG. 14 is a schematic diagram of a foreground running record when an application runs in the foreground for two consecutive times.

In an optional implementation, as shown in FIG. 14, if a previous foreground application and a current foreground application are a same application, that is, an application continuously runs in the foreground twice, time of running the application in the foreground twice is accumulated, to generate a foreground running record. For example, if the user switches the foreground application from a social application back to the home screen application, and then immediately returns the social application from the home screen application, it may be considered that the social application continuously runs in the foreground twice.

In an optional implementation, the application name appname may be a package name of the application, and a unit of the time (time) may be second (s). An Android system is used as an example. A package name of the Huawei application store is com.huawei.appmarket. In this case, if the Huawei application store runs in the foreground for 20 seconds at a time, the foreground running record generated by the electronic device for the Huawei application store may be (com.huawei.appmarket, 20).

Step S302: Obtain switching times of a second application relative to a first application based on the plurality of foreground running records.

Figure 15:
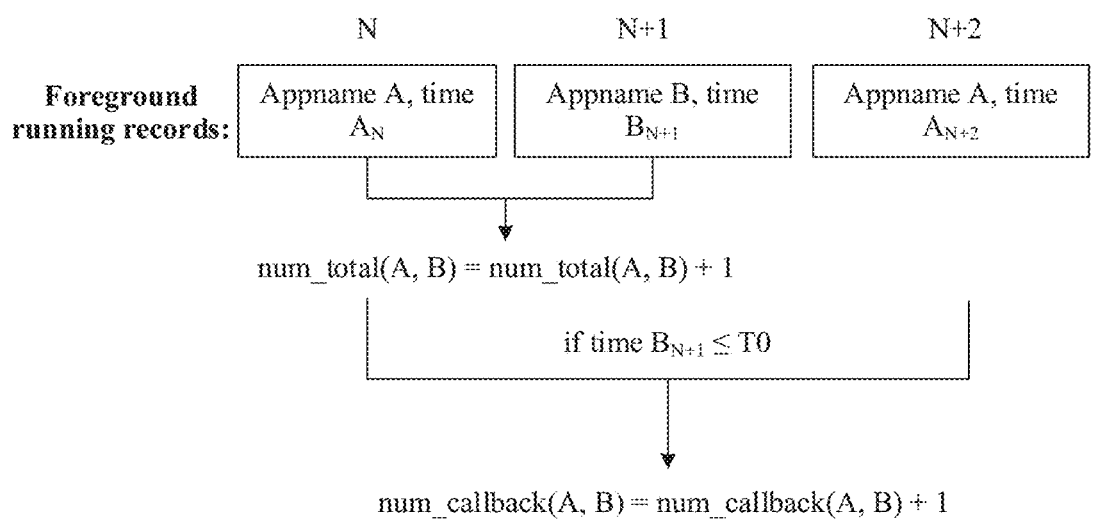
FIG. 15 is a schematic diagram in which an electronic device collects statistics on switching times and callback times between applications.

During specific implementation, as shown in FIG. 15, A represents the first application, B represents the second application, num_total(A, B) represents switching times of switching the foreground application from the first application A to the second application B, and an initial value of num_total(A, B) is 0. In this case, for a foreground running record N and a foreground running record N+1 that are generated adjacently, where N is a natural number, when the foreground running record N corresponds to the first application A and the foreground running record N+1 corresponds to the second application B, it is considered that a foreground task is switched from the first application A to the second application B for once, and therefore the switching times of switching the foreground application from the first application A to the second application B is increased by 1, that is:

num_total(A,B)=num_total(A,B)+1

Step S303: Obtain callback times of the second application relative to the first application based on the plurality of foreground running records.

During specific implementation, as shown in FIG. 15, num_callback(A, B) represents the callback times of the second application B relative to the first application A, and an initial value of num_callback(A, B) is 0. In this case, for the foreground running record N, the foreground running record N+1, and a foreground running record N+2 that are generated adjacently, where N is a natural number, when the foreground running record N and the foreground running record N+2 correspond to the first application A, and the foreground running record N+1 corresponds to the second application B, the electronic device determines whether duration time $B_{N+1}$ for which the second application B runs in the foreground and that is recorded in the foreground running record N+1 is less than or equal to first preset duration T0 and when time N is less than or equal to the first preset duration T0, the callback times of the second application relative to the first application is increased by 1, that is:

num_callback(A,B)=num_callback(A,B)+1

Step S304: Calculate a callback probability of the second application relative to the first application, where the callback probability of the second application relative to the first application is equal to a ratio of the callback times of the second application relative to the first application to the switching times of switching the foreground application from the first application to the second application.

That is:

$$\text{callback\_rate}(A, B) = \frac{\text{num\_callback}(A, B)}{\text{num\_total}(A, B)} \qquad 1$$

In addition, after calculating num_total(A, B), num_callback(A, B), and callback_rate(A, B), the electronic device may further generate switching statistics data of the first application A relative to the second application B, for example, Record(A, B):

Record(A,B)={num_callback,num_other,num_total, callback_rate}

Figure 16:
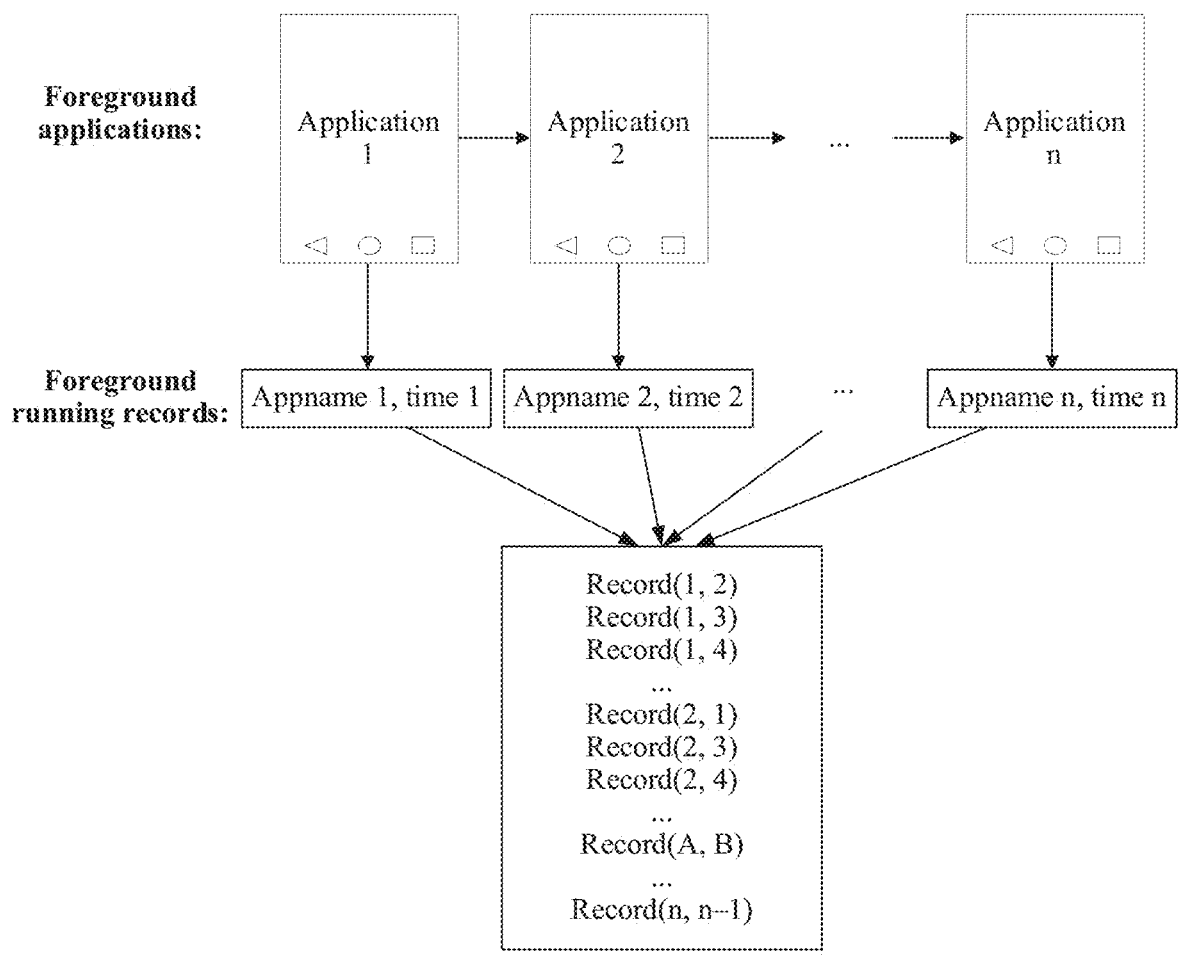
FIG. 16 is a schematic diagram of storing switching statistics data by an electronic device.

As shown in FIG. 16, the electronic device may store all statistics data, including Record(A, B), about switching between applications to a memory of the electronic device. The switching statistics data may be used as usage habit data of the user for query and use by the electronic device, or may be used by the electronic device to implement AI optimization based on a usage habit. The memory may be, for example, a flash memory (flash memory) inside the electronic device, or may be a cloud memory. This is not limited in this embodiment of this application.

The foregoing embodiment describes the solution of the application keepalive method provided in this application. It may be understood that, to implement the foregoing functions, the electronic device includes a corresponding hardware structure and/or software module for performing each of the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

For example, the foregoing electronic device implements a corresponding function by using a software module.

Figure 17:
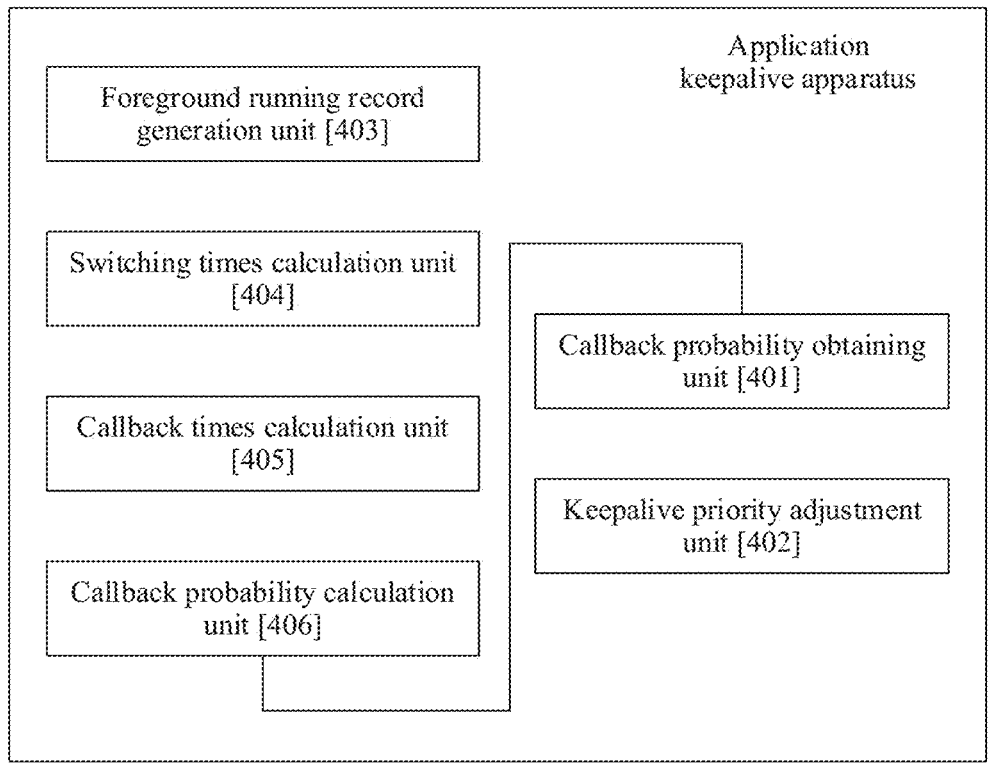
FIG. 17 is a schematic diagram of an application keepalive apparatus according to an embodiment of this application.

In an embodiment, as shown in FIG. 17, an application keepalive apparatus configured to implement the function of the behavior of the electronic device includes: a callback probability obtaining unit 401, configured to: when a foreground application is switched from a first application to a second application, obtain a callback probability of the second application relative to the first application, where the callback probability of the second application relative to the first application is a probability that the foreground application is switched from the second application back to the first application within first preset duration after the foreground application is switched from the first application to the second application; and a keepalive priority adjustment unit 402, configured to: when the callback probability of the second application relative to the first application is greater than a preset threshold, increase a keepalive priority of the first application when the first application is used as a background application. When system resources are insufficient, an electronic device ends a process of at least one background application in ascending order of keepalive priorities, to release system resources.

According to the foregoing technical solution, when the callback probability of the second application relative to the first application is relatively high, a background process of the first application is not likely to be scanned and killed by the electronic device, so that when the foreground application is switched from the second application back to the first application, the first application can continue to run in the foreground in a state before being switched to the background for running. In this way, operations of a user on the first application can be seamlessly connected. This meets a user's desire to continue using the first application, and improves user experience.

Optionally, the application keepalive apparatus further includes: a foreground running record generation unit 403, configured to generate a foreground running record for each application that has run in the foreground. Each foreground running record includes duration for which one application is used as a foreground application once. When a plurality of foreground running records are generated, the plurality of foreground running records are arranged in a time sequence in which applications corresponding to the plurality of foreground running records run in the foreground. Therefore, the electronic device may calculate the callback probability from the second application to the first application based on the foreground running record.

Optionally, the application keepalive apparatus further includes: a switching times calculation unit 404, configured to obtain, based on the plurality of foreground running records, switching times of switching the foreground application from the first application to the second application. For a foreground running record N and a foreground running record N+1 that are generated adjacently, where N is a natural number, when the foreground running record N corresponds to the first application and the foreground running record N+1 corresponds to the second application, the switching times of switching the foreground application from the first application to the second application is increased by 1.

Optionally, the application keepalive apparatus further includes: a callback times calculation unit 405, configured to obtain callback times of the second application relative to the first application based on the plurality of foreground running records. For the foreground running record N, the foreground running record N+1, and a foreground running record N+2 that are generated adjacently, where N is a natural number, when the foreground running record N and the foreground running record N+2 correspond to the first application, and the foreground running record N+1 corresponds to the second application, whether duration recorded in the foreground running record N+1 is less than or equal to the first preset duration is determined. When the duration recorded in the foreground running record N+1 is less than or equal to the first preset duration, the callback times of the second application relative to the first application is increased by 1.

Optionally, the application keepalive apparatus further includes: a callback probability calculation unit 406, configured to calculate the callback probability of the second application relative to the first application, where the callback probability of the second application relative to the first application is equal to a ratio of the callback times of the second application relative to the first application to the switching times of switching the foreground application from the first application to the second application.

Optionally; the keepalive priority adjustment unit 402 is specifically configured to: when the callback probability of the second application relative to the first application is greater than a preset threshold, increase the keepalive priority of the first application from a default priority to a first priority, so that the first application is not scanned and killed when running in the background.

Optionally, the keepalive priority adjustment unit 402 is further configured to: when duration for which the second application is currently used as the foreground application is greater than the first preset duration, decrease the keepalive priority of the first application from the first priority to the default priority. It should be understood that, when the duration for which the second application is currently used as the foreground application is greater than the first preset duration, there is no callback association between the first application and the second application, which means that the user may need to use the second application as the foreground application for long time. In this case, the electronic device does not perform special protection on the first application.

Optionally, the keepalive priority adjustment unit 402 is further configured to: when the foreground application is switched from the second application to a transition application, determine whether duration for which the transition application runs in the foreground is greater than second preset duration; and the keepalive priority adjustment unit 402 is further configured to: when the duration for which the transition application runs in the foreground is greater than the second preset duration, decrease the keepalive priority of the first application from the first priority to the default priority. The transition application includes at least a home screen application, a multitask window application, and a notification bar application. It should be understood that, if the duration for which the transition application runs in the foreground is greater than the second preset duration, it means that the user does not want to switch back to the first application. In this case, the electronic device does not perform special protection on the first application.

Optionally, the keepalive priority adjustment unit 402 is further configured to: when the foreground application is switched from the second application to a third application, decrease the keepalive priority of the first application from the first priority to the default priority. The third application is not a transition application. The transition application includes at least a home screen application, a multitask window application, and a notification bar application. It should be understood that, when the foreground application is switched from the second application to the third application, it indicates that there is no callback association between the first application and the second application in the current switching operation. In this case, the electronic device does not perform special protection on the first application.

Optionally; the callback probability obtaining unit 401 is further configured to: when the foreground application is switched from the first application to the second application, if the callback probability is not obtained, determine whether the second application directly jumps from the first application to the foreground for running. The keepalive priority adjustment unit 402 is further configured to: when the second application directly jumps from the first application to the foreground for running, increase the keepalive priority of the first application from a default priority to a first priority. It should be understood that if the second application directly jumps from the first application to the foreground for running, it indicates that there is a relatively high probability that the first application and the second application have a callback association. In this case, the electronic device increases the keepalive priority of the first application, so that the first application is not killed when running in the background.

Optionally, that the system resources of the electronic device are insufficient includes: available memory RAM of the electronic device is lower than a preset memory threshold, and/or processor usage of the electronic device is higher than a preset usage threshold, and/or power consumption of the electronic device is higher than a preset power consumption threshold.

In addition, the foregoing electronic device implements a corresponding function by using a hardware module.

In an embodiment, as shown in FIG. 1, the electronic device may include, for example, a display 194, a memory 121, and a processor 110. The display 194 and the memory 121 are coupled to the processor 110. The memory 121 is configured to store computer program code, where the computer program code includes computer instructions. When the processor 110 executes the computer instructions, the electronic device may perform functions or steps in the foregoing method embodiment.

Figure 18:
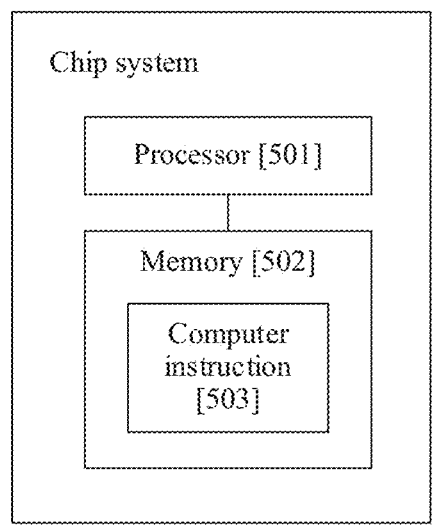
FIG. 18 is a schematic diagram of a chip system according to an embodiment of this application.

An embodiment of this application further provides a chip system. As shown in FIG. 18, the chip system includes a processor 501 and a memory 502. The memory 502 stores computer instructions 503. When the computer instructions 503 are executed by the processor 501, an electronic device may perform the steps in the foregoing embodiments. Certainly, the chip system may further include another discrete device. This is not specifically limited in this embodiment of this application.

An embodiment of this application further provides a computer storage medium. The computer storage medium includes computer instructions, and when the computer instructions are run on the foregoing electronic device, the electronic device is enabled to perform functions or steps performed by the electronic device in the foregoing method embodiment.

An embodiment of this application further provides a computer program product. When the computer program product runs on a computer, the computer is enabled to perform the functions or steps performed by the electronic device in the foregoing method embodiments.

The foregoing descriptions about implementations allow a person skilled in the art to clearly understand that, for the purpose of convenient and brief description, division of the foregoing functional modules is used as an example for illustration. During actual application, the foregoing functions can be allocated to different modules and implemented based on a requirement, that is, an inner structure of an apparatus is divided into different functional modules to implement all or some of the functions described above.

It is easily understood that, based on the several embodiments provided in this application, a person skilled in the art may obtain other embodiments by combining, splitting, reassembling, and the like embodiments of this application, and none of these embodiments goes beyond the protection scope of this application.

In the several embodiments provided in this application, it should be understood that the disclosed device and method may be implemented in other manners. For example, the described device embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by an electronic device, wherein the method comprises:
generating, for each one or more applications that have run in a foreground, a respective foreground running record comprising durations of use of the respective one or more applications;

arranging the foreground running records based on the durations;
obtaining a callback probability of a second application relative to a first application when a foreground application is switched from the first application to the second application, wherein the callback probability is a probability that the foreground application is switched to the second application back from the first application within a first preset duration after the foreground application is switched from the first application to the second application;
obtaining, based on the foreground running records, switching times of switching the foreground application from the first application to the second application;
increasing the switching times by one for a foreground running record N and a foreground running record N+1 that are generated adjacently when the foreground running record N corresponds to the first application and the foreground running record N+1 corresponds to the second application, wherein N is a natural number;
increasing a keepalive priority of the first application when the first application is a background application and when the callback probability is greater than a preset threshold; and
ending an operation of at least one background application in ascending order of keepalive priorities to release system resources when the system resources are insufficient.

2. The method of claim 1, further comprising:
obtaining callback times of the second application relative to the first application based on the foreground running records;
determining whether a second duration recorded in the foreground running record N+1 is less than or equal to the first preset duration for the foreground running record N, the foreground running record N+1, and a foreground running record N+2 that are generated adjacently when the foreground running record N and the foreground running record N+2 correspond to the first application and the foreground running record N+1 corresponds to the second application, wherein N is a natural number; and
increasing the callback times by one when the second duration is less than or equal to the first preset duration.

3. The method of claim 2, further comprising calculating the callback probability, wherein the callback probability is equal to a ratio of the callback times to the switching times.

4. The method of claim 1, further comprising further increasing the keepalive priority from a default priority to a first priority.

5. The method of claim 4, wherein after increasing the keepalive priority from the default priority to the first priority, the method further comprises:
identifying that a duration for which the second application is currently being used as the foreground application is greater than the first preset duration; and
decreasing, in response to the identifying, the keepalive priority from the first priority to the default priority.

6. The method of claim 4, wherein after increasing the keepalive priority from the default priority to the first priority, the method further comprises:
making a determination that the foreground application is switched from the second application to a transition application, wherein the transition application comprises at least one of a home screen application, a multitask window application, or a notification bar application;
determining, in response to the determination, whether a duration for which the transition application runs in the foreground is greater than a second preset duration; and
decreasing the keepalive priority from the first priority to the default priority when the duration is greater than the second preset duration.

7. The method of claim 4, wherein after increasing the keepalive priority from the default priority to the first priority, the method further comprises:
identifying that the foreground application is switched from the second application to a third application, wherein the third application is not a transition application that comprising at least one of a home screen application, a multitask window application, or a notification bar application; and
decreasing, in response to the identifying, the keepalive priority from the first priority to the default priority.

8. The method of claim 1, further comprising:
determining whether the second application directly jumps from the first application to the foreground for running when the foreground application is switched from the first application to the second application and when the callback probability is not obtained; and
increasing the keepalive priority from a default priority to a first priority when the second application directly jumps from the first application to the foreground for running.

9. The method of claim 1, wherein the system resources are insufficient when an amount of available random-access memory (RAM) of the electronic device is lower than a preset memory threshold, a processor usage of the electronic device is higher than a preset usage threshold, or power consumption of the electronic device is higher than a preset power consumption threshold.

10. An electronic device comprising:
a memory configured to store instructions; and
a processor coupled to the memory and configured to execute the instructions to cause the electronic device to:
generate, for each one or more applications that have run in a foreground, a respective foreground running record comprising durations of use of the respective one or more applications;
arrange the foreground running records based on the durations;
obtain a callback probability of a second application relative to a first application when a foreground application is switched from the first application to the second application, wherein the callback probability is a probability that the foreground application is switched to the second application back from the first application within a first preset duration after the foreground application is switched from the first application to the second application;
obtain, based on the foreground running records, switching times of switching the foreground application from the first application to the second application;
increase the switching times by one for a foreground running record N and a foreground running record N+1 that are generated adjacently when the foreground running record N corresponds to the first application and the foreground running record N+1 corresponds to the second application, wherein N is a natural number;
increase a keepalive priority of the first application when the first application is used as a background application when the callback probability is greater than a preset threshold; and end an operation of at least one background application in ascending order of keepalive priorities to release system resources when the system resources are insufficient.

11. The electronic device of claim 10, wherein the processor is further configured to execute the instructions to cause the electronic device to:
obtain callback times of the second application relative to the first application based on the foreground running records;
determine whether a second duration recorded in the foreground running record N+1 is less than or equal to the first preset duration for the foreground running record N, the foreground running record N+1, and a foreground running record N+2 that are generated adjacently when the foreground running record N and the foreground running record N+2 correspond to the first application and the foreground running record N+1 corresponds to the second application, wherein N is a natural number; and
increase the callback times by one when the second duration is less than or equal to the first preset duration.

12. The electronic device of claim 11, wherein the processor is further configured to execute the instructions to cause the electronic device to calculate the callback probability, wherein the callback probability is equal to a ratio of the callback times to the switching times.

13. The electronic device of claim 10, wherein the processor is further configured to execute the instructions to cause the electronic device to further increase the keepalive priority from a default priority to a first priority.

14. The electronic device of claim 13, wherein after increasing the keepalive priority from the default priority to the first priority, the processor is further configured to execute the instructions to cause the electronic device to:
identify that a duration for which the second application is currently being used as the foreground application is greater than the first preset duration; and
decrease, in response to the identifying, the keepalive priority from the first priority to the default priority.

15. The electronic device of claim 13, wherein after increasing the keepalive priority from the default priority to the first priority, the processor is further configured to execute the instructions to cause the electronic device to:
make a determination that the foreground application is switched from the second application to a transition application, wherein the transition application comprises at least one of a home screen application, a multitask window application, or a notification bar application;
determine, in response to the determination, whether a duration for which the transition application runs in the foreground is greater than a second preset duration; and
decrease the keepalive priority from the first priority to the default priority when the duration is greater than the second preset duration.

16. A computer program product comprising computer-executable instructions that are stored on a non-transitory computer-readable storage medium and that, when executed by a processor, cause an electronic device to:
generate, for each one or more applications that have run in a foreground, a respective foreground running record comprising durations of use of the respective one or more applications;
arrange the foreground running records based on the durations;
obtain a callback probability of a second application relative to a first application when a foreground application is switched from the first application to the second application, wherein the callback probability is a probability that the foreground application is switched to the second application back from the first application within a first preset duration after the foreground application is switched from the first application to the second application;
obtain, based on the foreground running records, switching times of switching the foreground application from the first application to the second application;
increase the switching times by one for a foreground running record N and a foreground running record N+1 that are generated adjacently when the foreground running record N corresponds to the first application and the foreground running record N+1 corresponds to the second application, wherein N is a natural number;
increase a keepalive priority of the first application when the first application is used as a background application when the callback probability is greater than a preset threshold; and
end an operation of at least one background application in ascending order of keepalive priorities to release system resources when the system resources are insufficient.

* * * * *